United States Patent
Lee

(10) Patent No.: US 7,945,148 B2
(45) Date of Patent: May 17, 2011

(54) METHOD AND APPARATUS FOR CORRECTING HAND-SHAKE IN DIGITAL IMAGE PROCESSING APPARATUS

(75) Inventor: Jin-gi Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/715,490

(22) Filed: Mar. 2, 2010

(65) Prior Publication Data

US 2010/0232774 A1 Sep. 16, 2010

(30) Foreign Application Priority Data

Mar. 10, 2009 (KR) .................. 10-2009-0020354

(51) Int. Cl.
*G03B 17/00* (2006.01)
(52) U.S. Cl. ..................................... 396/52; 348/208.99
(58) Field of Classification Search ..................... 396/52
See application file for complete search history.

(56) References Cited

U.S. PATENT DOCUMENTS

| 5,937,214 | A | * | 8/1999 | Shintani et al. | ................. | 396/55 |
| 2003/0095797 | A1 | * | 5/2003 | Nakata | ............................ | 396/54 |
| 2004/0240867 | A1 | * | 12/2004 | Hara | ............................... | 396/55 |
| 2009/0067827 | A1 | * | 3/2009 | Yoshida et al. | ................. | 396/55 |

* cited by examiner

*Primary Examiner* — W. B. Perkey
*Assistant Examiner* — Dennis Hancock
(74) *Attorney, Agent, or Firm* — Drinker Biddle & Reath LLP

(57) ABSTRACT

Provided is a digital image processing apparatus that supports a hand-shake correcting function. The digital image processing apparatus includes: a shutter button operating in two stages that comprises a half-shutter state and a full-shutter state; a first filter filtering shock-waves generated in the half-shutter state when a half-shutter signal is in an ON state; and a second filter filtering shock-waves generated in the full-shutter state when a full-shutter signal is changed from an ON state to an OFF state.

20 Claims, 5 Drawing Sheets

METHOD AND APPARATUS FOR CORRECTING HAND-SHAKE IN DIGITAL IMAGE PROCESSING APPARATUS

CROSS-REFERENCE TO RELATED PATENT APPLICATIONS

This application claims the benefit of Korean Patent Application No. 10-2009-0020354, filed on Mar. 10, 2009, in the Korean Intellectual Property Office, the disclosure of which is incorporated herein in its entirety by reference.

BACKGROUND

The present invention relates to a digital image processing apparatus, and more particularly, to a digital image processing apparatus supporting a hand-shake correction function.

Optical hand-shake correction of a lens compensation type or of an image sensor compensation type used in digital image processing apparatuses is a function for correcting hand-shakes caused by an external shock. Therefore, an optical hand-shake correction for correcting the hand-shakes caused by the external shock operates in a different algorithm than that of a hand-shake correction for correcting hand-shake generated in a usual photographing operation.

For example, an instant correction function operates due to a shock-wave caused by an operation of a shutter button when taking pictures. However, a shock-wave as described above is not recognized as a hand-shake signal in digital image processing apparatuses that have an optical hand-shake correction function, and accordingly, an optical hand-shake correction function cannot deal with a hand-shake generated when taking pictures.

To address the problem described above, a shock-wave generated due to an operation of a shutter button may be dealt with using a complex controlling algorithm. Otherwise, the size of the shutter button, or the shape or material forming a shutter contact plate switch, which is located under the shutter button and directly affects the shock-wave, may be improved. However, to implement the improvements described above, fabrication costs increase and camera design may be limited.

SUMMARY

The present invention provides a filter that corrects hand-shakes generated when a shutter button is operated in consideration of characteristics of shock-wave caused by the shutter operation.

According to an aspect of the present invention, there is provided a digital image processing apparatus including: a shutter button operating in two stages, the two stages comprising a half-shutter state and a full-shutter state; a first filter filtering shock-waves generated in the half-shutter state when a half-shutter signal is in an ON state; and a second filter filtering shock-waves generated in the full-shutter state when a full-shutter signal is changed from an ON state to an OFF state.

According to another aspect of the present invention, there is provided a digital image processing apparatus including: an optical hand-shake corrector based on a lens compensation or an image sensor compensation for correcting a hand-shake when the hand-shake is not generated due to operation of a shutter button; and a shutter-button hand-shake processor using one or more filters for correcting a hand-shake when the hand-shake is generated due to operation of the shutter button.

According to another aspect of the present invention, there is provided a method of correcting hand-shake in a digital image processing apparatus, in which includes a shutter button operating in two stages that comprises a half-shutter state and a full-shutter state, the method including: filtering shock-waves generated in the half-shutter state when a half-shutter signal is in an ON state; and filtering shock-waves generated in the full-shutter state when a full-shutter signal is changed from an ON state to an OFF state.

According to another aspect of the present invention, there is provided a method of correcting hand-shake in a digital image processing apparatus, the method including: correcting a hand-shake optically based on a lens compensation or an image sensor compensation when the hand-shake is not generated due to operation of a shutter button; and correcting a hand-shake by using one or more filters when the hand-shake is generated due to operation of the shutter button.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
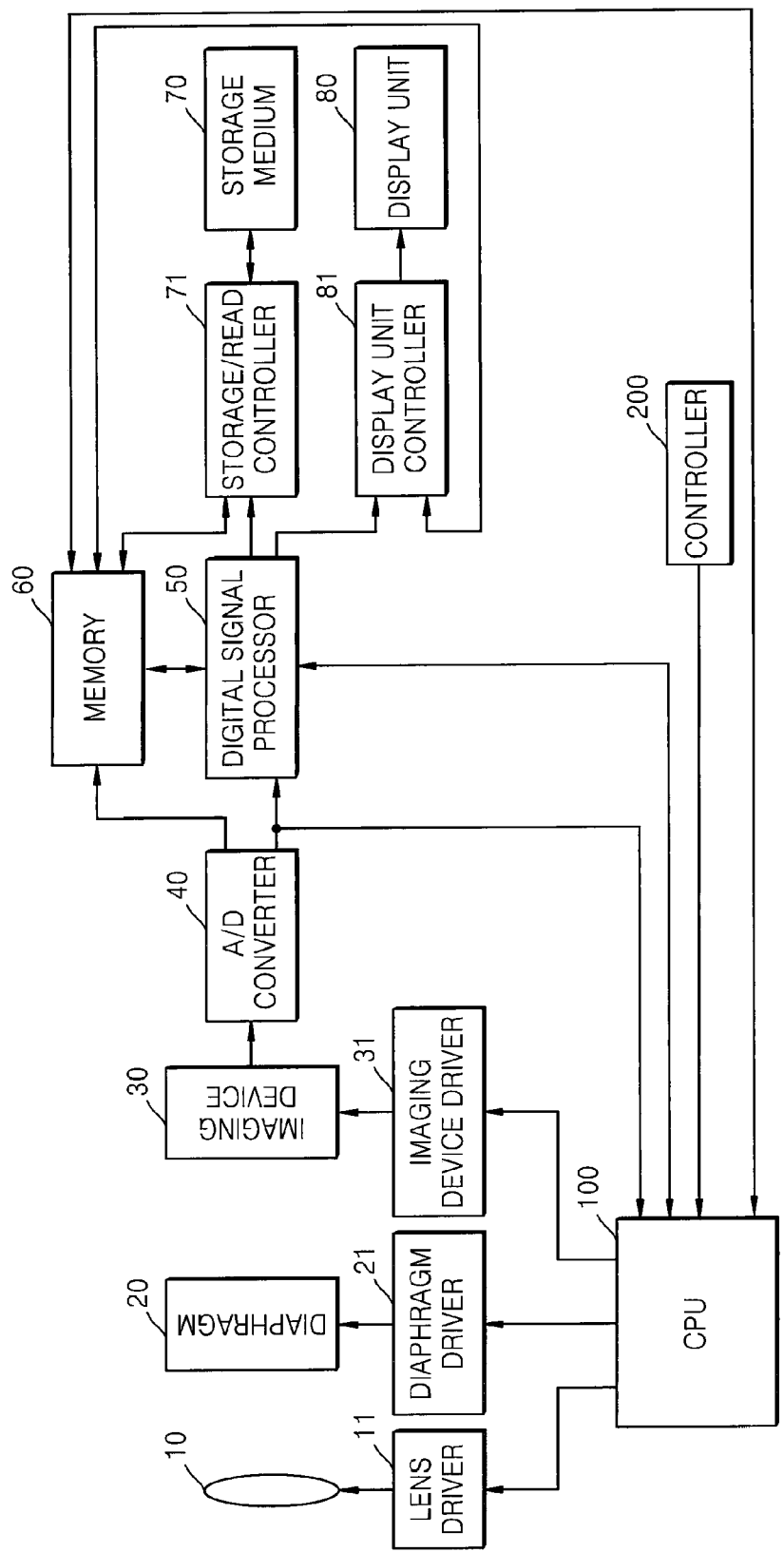
FIG. 1 is a block diagram of a digital photographing apparatus which is an example of a digital image processing apparatus.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

FIG. 1 is a block diagram of a digital photographing apparatus which is a kind of a digital image processing apparatus. However, the present invention is not limited to the digital photographing apparatus illustrated in FIG. 1, but may be applied to other digital image processing apparatuses such as personal digital assistants (PDAs) and personal multimedia players (PMPs). Other embodiments and modifications may also be applied to other digital image processing apparatuses.

Overall operations of the digital photographing apparatus are controlled by a central processing unit (CPU) 100. In addition, the digital photographing apparatus includes a controller 200 including keys generating electric signals according to a user's manipulation. The electric signals generated by the controller 200 are transferred to the CPU 100 so that the CPU 100 controls the digital photographing apparatus according to the electric signals.

In a photographing mode, when electric signals generated by the controller 200 are supplied to the CPU 100, the CPU 100 controls a lens driver 11, a diaphragm driver 21, and an imaging device driver 31 according to the electric signals. Accordingly, the location of a lens 10, the opening degree of a diaphragm 20, and a sensitivity of an imaging device 30 are controlled. The imaging device 30 generates data from input light, and an analog/digital (A/D) converter 40 converts analog data output from the imaging device 30 into digital data. According to characteristics of the imaging device 30, the A/D converter 40 may not be required.

The data output from the imaging device 30 may be input into a digital signal processor 50 through a memory 60, may be input into the digital signal processor 50 without passing through the memory 60, or may be input into the CPU 100, if necessary. Here, the memory 60 may include read only memory (ROM) or random access memory (RAM). The digital signal processor 50 may perform digital signal processing such as gamma compensation or white balancing.

Data output from the digital signal processor 50 may be transferred to a display controller 81 through the memory 60 or directly. The display controller 81 controls a display unit 80 so as to display images on the display unit 80.

In addition, the data output from the digital signal processor 50 may be input into a storage/read controller 71 through the memory 60 or directly. The storage/read controller 71 may store the image data in a storage medium 70 automatically or according to the signal from the user.

The storage/read controller 71 may read data from image files stored in the storage medium 70, and then, may input the data to the display controller 81 through the memory 60 or other paths so that the images may be displayed on the display unit 80. The storage medium 70 may be detachable, or may be permanently mounted in the digital photographing apparatus.

Figure 2:
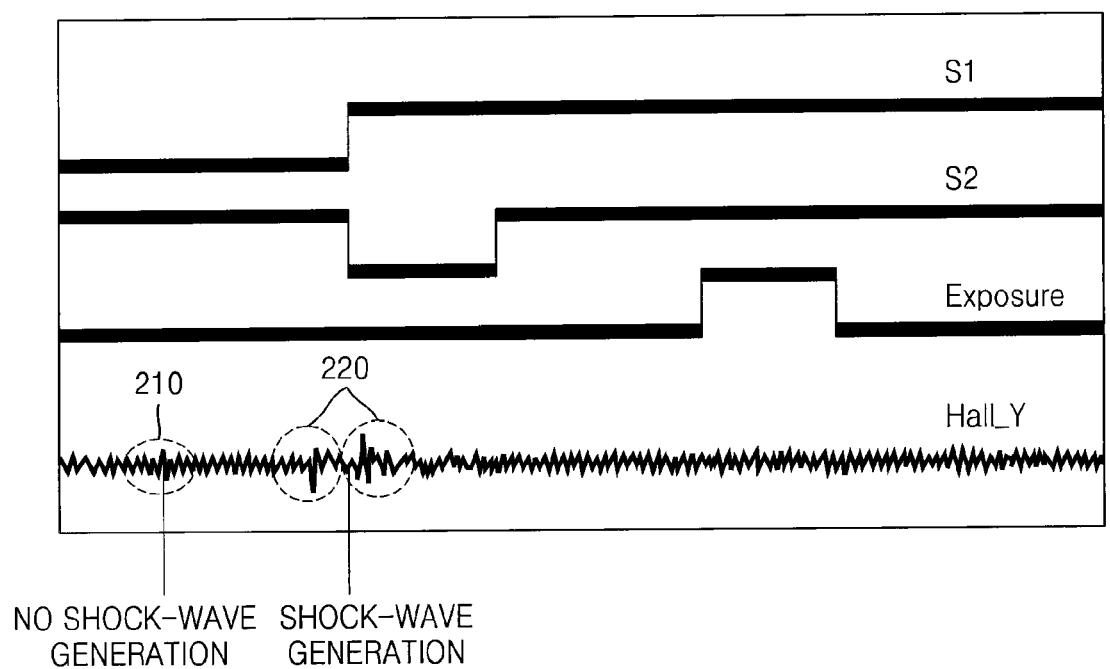
FIG. 2 is a graph showing a waveform of a shock-wave generated when a shutter button of the digital photographing apparatus illustrated in FIG. 1 is operated.

FIG. 2 is a diagram showing a waveform of a shock-wave generated when a shutter button of the digital photographing apparatus is operated.

The shutter button may be operated into two stages. The first stage is a half-shutter state S1 for focusing and exposing, and the second stage is a full-shutter state S2, in which the shutter button is completely pushed. Professional photographers are well aware of the half-shutter state S1 and the full-shutter state S2, and may perform the shutter operation smoothly.

However, when most general users of digital photographing apparatuses push the shutter button in the half-shutter state S1 (S1 ON), the shock-wave generated when the full-shutter is turned off is generated. When signals generated by a hall sensor, that is a location sensor for recognizing the generation of shock-wave, are observed, the shock-wave is not generated in a section (210) and the shock-wave is generated in a section (220) when the half-shutter state S1 is turned on (ON) as shown in FIG. 2.

However, a shock-wave as described above is not generally recognized as a hand-shake signal in a conventional digital photographing apparatus having an optical hand-shake correction function, and accordingly, a general method of controlling a hand-shake correction function may not deal with the shock-wave described above.

Figure 3:
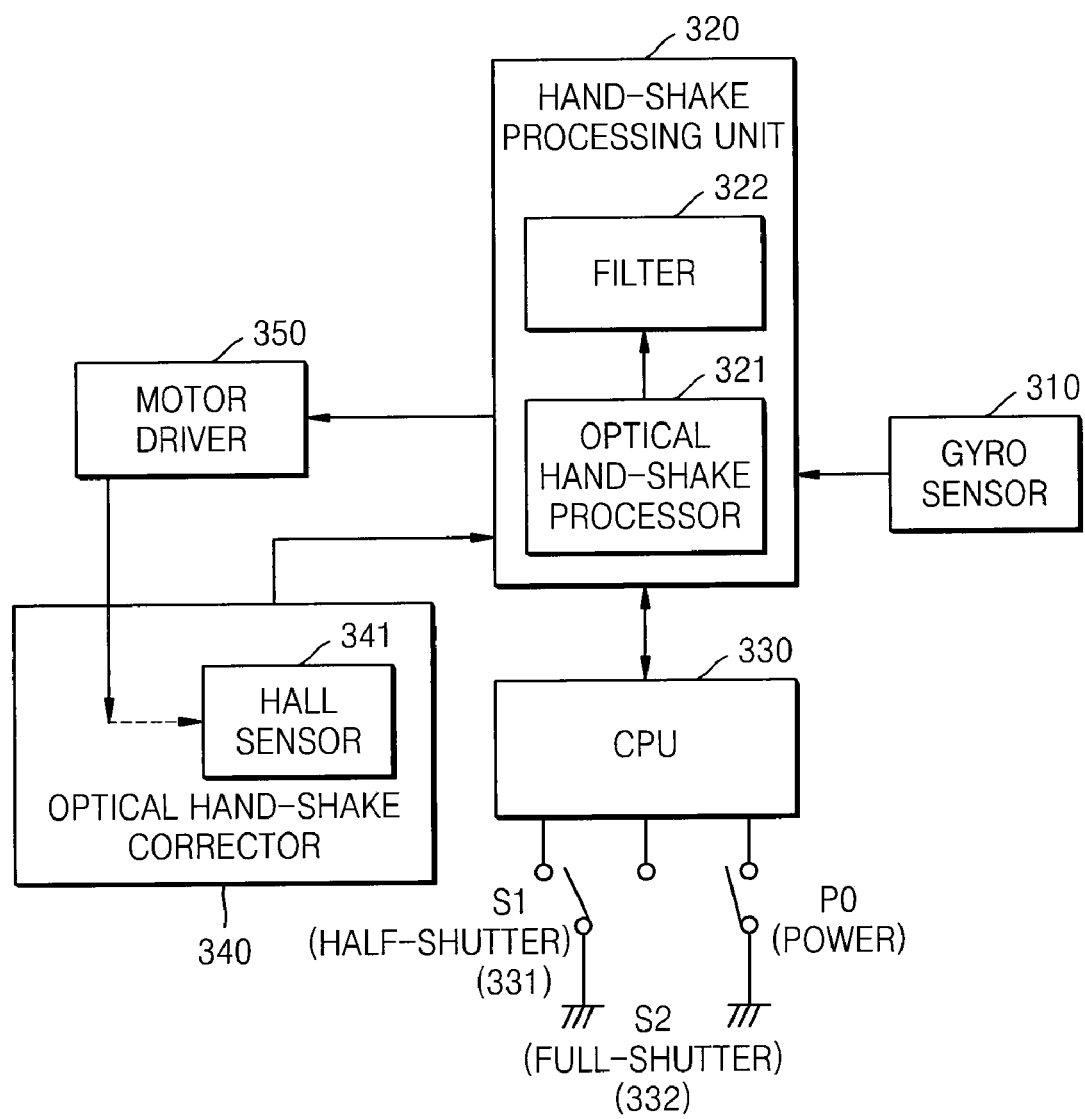
FIG. 3 is a block diagram of a hand-shake correction apparatus according to an embodiment of the present invention.

FIG. 3 is a block diagram of a hand-shake correction apparatus according to an embodiment of the present invention.

The hand-shake correction apparatus includes a gyro sensor 310, a hand-shake processing unit 320, a CPU 330, an optical hand-shake corrector 340, and a motor driver 350.

The gyro sensor 310 is an angular velocity sensor that detects a hand-shake signal. The hand-shake processing unit 320 includes an optical hand-shake processor 321 and a filtering unit 322. The CPU 330 may correspond to a digital signal processor of a digital camera.

The CPU 330 may include the hand-shake processor 320, or the hand-shake processing unit 320 may be separated from the CPU 330 as shown in FIG. 3. Additionally, the optical hand-shake processor 321 may include a chip for optical image stabilizer (OIS).

The optical hand-shape corrector 340 has a mechanism (not shown) for performing a hand-shake correction operation, and the mechanism may include a correction lens or a location sensor such as a hall sensor. The location sensor detects a precise location of the lens or the image sensor included in the optical hand-shake corrector 340 as the lens or the image sensor operates.

The hand-shake processing unit 320 may maintain a correcting location by feeding back the location data of the location sensor through the optical hand-shake processor 321. The gyro sensor 310 senses a shock-wave generated in the digital photographing apparatus due to external shock, and the optical hand-shake corrector 340 generates a compensation signal corresponding to the shock-wave generated to perform hand-shake correction in conjunction with the optical hand-shake processor 321.

There are many types of external shock-waves, however, it is difficult to correct a hand-shake generated by operating the shutter button in the half-shutter state S1 (331) and the full-shutter state S2 (332) through the above processes. Therefore, the hand-shake processing unit 320 further includes a filter 322 so as to correct a hand-shake that cannot be dealt with by the optical hand-shake processor 321, according to the embodiment of the present invention.

Figure 4:
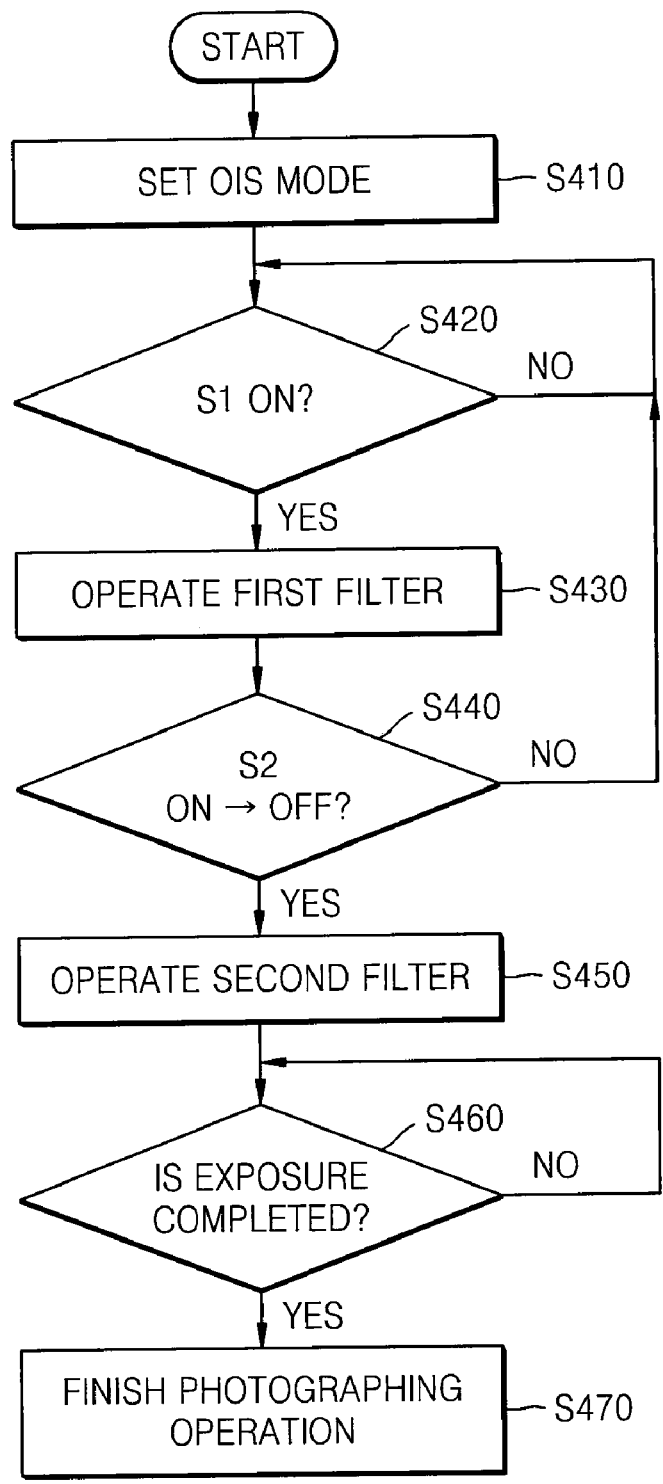
FIG. 4 is a flowchart illustrating a method of correcting for a hand-shake generated when the shutter button is operated, according to an embodiment of the present invention.

A method of performing the hand-shake correction using the filter 322 is illustrated in FIG. 4.

FIG. 4 is a flowchart illustrating a method of correcting a hand-shake generated by the shutter operations.

An OIS mode is set in a menu screen of the digital photographing apparatus (S410). After that, it is identified whether the half-shutter operation is performed (S420). When the half-shutter operation is performed, a first filter is driven (S430). A second filter is operated when the full-shutter is switched from an ON state to an OFF state (S440). In addition, it is identified whether an exposure operation is finished (S460). When an exposure operation is finished (S460), for example, the photographing is finished (S470).

That is, filters respectively dealing with shock-waves generated in the half-shutter state S1 and the full-shutter state S2 are operated according to the present invention. When shock waves have different frequencies from each other, the first filter and the second filter are different from each other. However, when the shock-waves have the same frequency as each other, the first and second filter may be the same filter. The first and second filters operate from the time when the shutter button is pushed to the time when the photographing is completed in the digital photographing apparatus.

Figure 5:
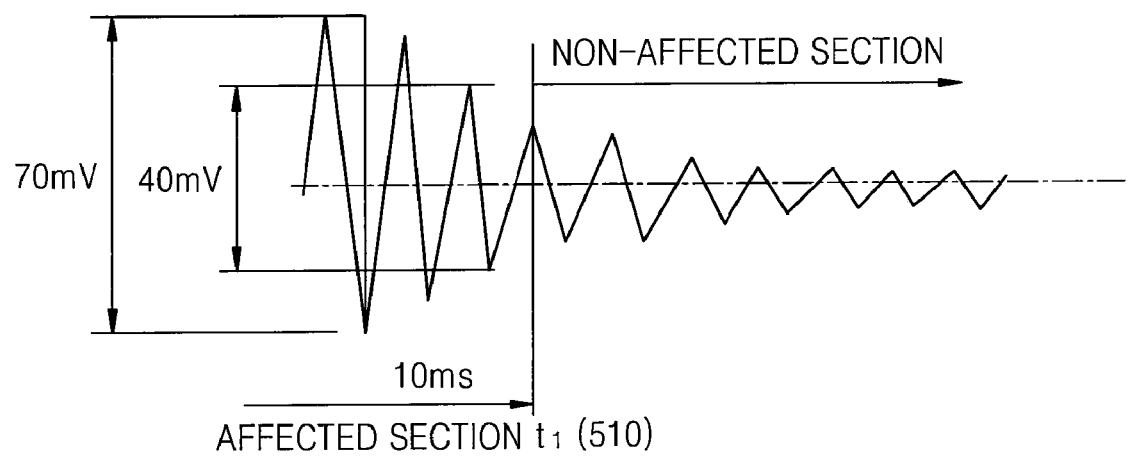
FIG. 5 is a graph showing a waveform of a shock-wave generated when the shutter button is operated.

FIG. 5 shows waveforms of a shock-wave that is generated when the shutter button is operated. FIG. 5 shows a section t1 (510), in which the shutter button operation affects the operation of the optical hand-shake processor (321). It may vary depending on the shape or design of the shutter button, but the section in which a shock-wave generated by operation of the shutter button affects the operation of the optical hand-shake processor lasts about 10 msec, and after that, the shutter operation hardly affects the operation of the hand-shake processor (321).

Therefore, the first and second filters may be designed according to the magnitudes of shock-waves generated by the half-shutter and the full-shutter states, for example, from about 40 mV to about 70 mV, and the time the shock-waves affect operations of the hand-shake processor (321). The first and second filters may be high pass filters (HPFs) or low pass filters (LPFs). The time the shock-waves affect the operations of the hand-shake processor may be set by a designer of the digital photographing apparatus.

FIG. 5 shows one embodiment of a shock-wave. The waveform of the shock-wave may vary depending on the shape of the shutter button or a shutter connector switch that is assembled with the shutter button to function as a switch.

According to the present invention, a hand-shake generated due to the shutter button operation, which is not recognized as a hand-shake signal in a conventional digital image processing apparatus that supports a optical hand-shake correction function, may be corrected.

In particular, in order to deal with a shock-wave generated by operating the shutter button, conventional approaches, for example, complex controlling algorithms or changes in hardware such as the size of shutter button or the shape or material forming the shutter contact plate switch, which is located under the shutter button and directly affects the shock-wave, are generally costly. Whereas, the present invention corrects shock-waves generated due to operating the shutter button without increasing manufacturing costs.

The invention can also be embodied as computer readable codes on a computer readable recording medium. The computer readable recording medium may be any data storage device that can store data that can be thereafter read by a computer system.

The computer readable codes are configured to execute the steps of the method of controlling the digital photographing apparatus when the computer readable codes are read from the computer readable storage medium by the digital signal processor or the CPU and executed. The computer readable codes may be realized using various programming languages. Also, functional programs, codes, and code segments for accomplishing the present invention may be construed by programmers skilled in the art to which the present invention pertains.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A digital image processing apparatus comprising:
   a shutter button operating in two stages, the two stages comprising a half-shutter state and a full-shutter state;
   a first filter filtering shock-waves generated in the half-shutter state when a half-shutter signal is in an ON state; and
   a second filter filtering shock-waves generated in the full-shutter state when a full-shutter signal is changed from an ON state to an OFF state.

2. The digital image processing apparatus of claim 1, wherein the first filter and the second filter operate from when the shutter button is pushed until a photographing operation is finished.

3. The digital image processing apparatus of claim 1, wherein the half-shutter state focuses and exposes an image.

4. The digital image processing apparatus of claim 1, wherein the full-shutter state occurs when the shutter button is completely pushed.

5. The digital image processing apparatus of claim 1, wherein the first filter is a high pass filter.

6. The digital image processing apparatus of claim 5, wherein the second filter is a high pass filter.

7. The digital image processing apparatus of claim 1, wherein the first filter is a low pass filter.

8. The digital image processing apparatus of claim 7, wherein the second filter is a low pass filter.

9. The digital image processing apparatus of claim 1, wherein shock waves generated in the half-shutter state are of a different frequency than shock waves generated in a full-shutter state.

10. A digital image processing apparatus comprising:
an optical hand-shake corrector based on a lens compensation or an image sensor compensation for correcting a hand-shake when the hand-shake is not generated due to operation of a shutter button; and
a shutter-button hand-shake processor using one or more filters for correcting a hand-shake when the hand-shake is generated due to operation of the shutter button.

11. The digital image processing apparatus of claim 10, wherein the shutter button is operated in two stages that comprise a half-shutter state and a full-shutter state, and the hand-shake processor comprises the following: a first filter filtering shock-waves generated in the half-shutter state when a half-shutter signal is in an ON state; and a second filter filtering shock-waves generated in the full-shutter state when a full-shutter signal is changed from an ON state to an OFF state.

12. The digital image processing apparatus of claim 11, wherein shock waves generated in the half-shutter state are of a different frequency than shock waves generated in a full-shutter state.

13. A method of correcting hand-shake in a digital image processing apparatus, in which includes a shutter button operating in two stages that comprises a half-shutter state and a full-shutter state, the method comprising:
filtering shock-waves generated in the half-shutter state when a half-shutter signal is in an ON state; and
filtering shock-waves generated in the full-shutter state when a full-shutter signal is changed from an ON state to an OFF state.

14. The method of claim 13, further comprising taking a photograph of an image.

15. The method of claim 13, wherein the half-shutter state focuses and exposes an image.

16. The method of claim 13, wherein the full-shutter state occurs when the shutter button is completely pushed.

17. A method of correcting hand-shake in a digital image processing apparatus, the method comprising:
correcting a hand-shake optically based on a lens compensation or an image sensor compensation when the hand-shake is not generated due to operation of a shutter button; and
correcting a hand-shake by using one or more filters when the hand-shake is generated due to operation of the shutter button.

18. The method of claim 17, wherein the shutter button is operated in two stages that comprises a half-shutter state and a full-shutter state, and the correcting of a hand-shake using the filters comprises: filtering shock-waves generated in the half-shutter state when a half-shutter signal is in an ON state; and
filtering shock-waves generated in the full-shutter state when a full-shutter signal is changed from an ON state to an OFF state.

19. The method of claim 18, wherein the first filter is a high pass filter.

20. The method of claim 19, wherein the second filter is a high pass filter.

* * * * *